(12) United States Patent
Van Loon

(10) Patent No.: US 8,769,916 B2
(45) Date of Patent: Jul. 8, 2014

(54) FARM IMPLEMENT FOR HARVESTING AND MOWING THAT IS RELESABLY COUPLABLE TO AND POWERED BY A TRACTOR

(75) Inventor: Leon Van Loon, St. Louis, MI (US)

(73) Assignee: Marloo Equipment, LLC, St. Louis, MO (US)

( * ) Notice: Subject to any disclaimer, the term of this patent is extended or adjusted under 35 U.S.C. 154(b) by 0 days.

(21) Appl. No.: 13/467,714

(22) Filed: May 9, 2012

(65) Prior Publication Data

US 2012/0285133 A1    Nov. 15, 2012

Related U.S. Application Data

(60) Provisional application No. 61/484,181, filed on May 9, 2011.

(51) Int. Cl.
*A01D 75/30* (2006.01)
(52) U.S. Cl.
USPC ............................................................. 56/6
(58) Field of Classification Search
USPC ................ 56/6, 7, 15.8, 13.6, 15.2, DIG. 22; 475/83, 200; 180/53.1, 337, 338; 172/439, 311, 388, 452; 414/703
See application file for complete search history.

(56) References Cited

U.S. PATENT DOCUMENTS

| | | | |
|---|---|---|---|
| 1,818,487 A * | 8/1931 | Lontz | 56/7 |
| 2,153,876 A * | 4/1939 | Roseman | 56/7 |
| 2,682,740 A * | 7/1954 | Miller et al. | 56/6 |
| 2,753,674 A * | 7/1956 | Cunningham, Jr. et al. | 56/6 |
| 2,952,961 A * | 9/1960 | Engler | 56/13.6 |
| 3,058,280 A * | 10/1962 | Lewis | 56/6 |
| 3,070,938 A * | 1/1963 | Winget | 56/6 |
| 3,106,811 A * | 10/1963 | Heth et al. | 56/7 |
| 3,224,176 A * | 12/1965 | Taylor | 56/7 |
| 3,473,302 A * | 10/1969 | Caldwell | 56/6 |
| 3,650,096 A * | 3/1972 | Caldwell | 56/7 |
| 4,161,858 A * | 7/1979 | Gerrits | 56/7 |
| 4,178,744 A * | 12/1979 | Allely et al. | 56/16.2 |
| 4,178,746 A * | 12/1979 | Allely | 56/53 |
| 4,192,123 A * | 3/1980 | Allely | 56/13.6 |
| 4,306,402 A * | 12/1981 | Whimp | 56/7 |
| 4,330,981 A * | 5/1982 | Hall et al. | 56/7 |
| 4,370,846 A * | 2/1983 | Arnold | 56/6 |
| 4,481,755 A * | 11/1984 | Carr | 56/7 |
| 4,579,183 A * | 4/1986 | Irikura et al. | 180/53.1 |
| 4,658,662 A * | 4/1987 | Rundle | 74/331 |
| 5,046,994 A * | 9/1991 | Hasegawa et al. | 475/83 |
| 5,069,022 A * | 12/1991 | Vandermark | 56/6 |
| 5,113,640 A * | 5/1992 | Colistro | 56/6 |
| 5,133,174 A * | 7/1992 | Parsons, Jr. | 56/6 |
| 5,297,378 A * | 3/1994 | Smith | 56/7 |

(Continued)

*Primary Examiner* — Árpád Fábián-Kovács
(74) *Attorney, Agent, or Firm* — Young & Basile

(57) ABSTRACT

A farm implement configured to be releasably coupled to a tractor equipped with a rearwardly oriented power take of device. The farm implement includes a central frame; at least two forward crop engaging arms mounted on the frame, that extend outward from a central axis to a first width and; at least two crop rearward engaging arms mounted on the frame. The rearward crop engaging arms extend outward from a central axis to a second width. A plurality of crop engaging members, are positioned on each of the forward and rearward crop engaging arms. The implement also includes a power transmission mechanism operatively connected to the forward crop and rearward engaging arms and engageable with the power take off apparatus on the associated tractor.

17 Claims, 18 Drawing Sheets

(56) References Cited

U.S. PATENT DOCUMENTS

| | | | |
|---|---|---|---|
| 5,321,938 A * | 6/1994 | LeBlanc | 56/6 |
| 5,343,680 A * | 9/1994 | Reichen et al. | 56/249 |
| RE34,833 E * | 1/1995 | Hasegawa et al. | 475/83 |
| 5,459,984 A * | 10/1995 | Reichen et al. | 56/7 |
| 5,865,017 A * | 2/1999 | Short | 56/7 |
| 6,059,067 A * | 5/2000 | Shibahata et al. | 180/338 |
| 6,131,378 A * | 10/2000 | Lees | 56/7 |
| 6,205,757 B1 * | 3/2001 | Dow et al. | 56/366 |
| 6,481,191 B1 * | 11/2002 | Short | 56/7 |
| 6,698,170 B2 * | 3/2004 | Tironi | 56/6 |
| 6,758,284 B2 * | 7/2004 | Myers | 172/311 |
| 7,310,929 B2 * | 12/2007 | Dow et al. | 56/192 |
| 7,334,645 B2 * | 2/2008 | Stevenson et al. | 172/677 |
| 7,523,789 B2 * | 4/2009 | Yamaguchi et al. | 172/439 |
| D602,504 S * | 10/2009 | Lees | D15/28 |
| 7,640,719 B2 * | 1/2010 | Boyko | 56/13.6 |
| 7,971,417 B2 * | 7/2011 | Link | 56/15.7 |
| 8,091,331 B2 * | 1/2012 | Dow et al. | 56/192 |
| 8,209,946 B2 * | 7/2012 | Neudorf et al. | 56/15.2 |
| 2002/0184865 A1 * | 12/2002 | Short | 56/7 |
| 2002/0184866 A1 * | 12/2002 | Doerflinger | 56/7 |
| 2004/0079061 A1 * | 4/2004 | Wubbels | 56/11.9 |
| 2004/0148917 A1 * | 8/2004 | Eastwood | 56/6 |
| 2004/0221558 A1 * | 11/2004 | Stevenson et al. | 56/6 |
| 2007/0119139 A1 * | 5/2007 | Hofmann et al. | 56/228 |
| 2011/0209453 A1 * | 9/2011 | Neudorf et al. | 56/15.2 |

* cited by examiner

FARM IMPLEMENT FOR HARVESTING AND MOWING THAT IS RELESABLY COUPLABLE TO AND POWERED BY A TRACTOR

CROSS-REFERENCE TO RELATED APPLICATIONS

This application claims the benefit of U.S. Provisional Application No. 61/484,181, filed May 9, 2011, which is hereby incorporated by reference in its entirety.

TECHNICAL FIELD

The present invention relates to farm implements, in general. More particularly, the present invention pertains to farm implements such as mowers that can be powered by tractor devices.

BACKGROUND

Harvesting and mowing operations are integral to farm operations. Many such operations are accomplished using farm implements towed and powered by tractors. Tractors are used for a variety of operations on the modern farm and represent a major capital investment. Thus there is a strong desire to utilize such devices and to maximize the efficiency of any operation that is performed by a tractor.

In farming operations such as mowing and harvesting, various devices are towed behind the tractor. These include mowers and the like. These devices can be powered by connection with the power take off apparatus associated with the tractor. In many instances, the efficiency of the farming operation such as mowing is dictated by how rapidly a given field can traversed. In mowing operations this equated to how rapidly the given field can be mowed.

It can be appreciated that the efficiency of the operation depends, at least in part, on the size or span of the farm implement. Increased efficiency can permit harvest of greater crop volumes in a shorter interval at optimum quality. In order to increase efficiency, heretofore, farmers have had to increase the numbers of tractors mowing in a given field. Using multiple tractors increases both capital and labor costs. Thus it would be desirable to provide a mowing device that could be used efficiently and effectively to increase harvest efficiency without increasing capital or labor costs.

The ability to enlarge or increase the operational capacity of various tractor drawn and powered farm implements such as mowing devices has been limited to date. It would be desirable to provide an articulated farm implement that can be configured to accomplish a scope of farming operations such as mowing that, heretofore required use of self-powered farm implements.

SUMMARY

Disclosed herein is a farm implement configured to be releasably coupled to a tractor, the tractor having at least one rearwardly oriented power take off device. The farm implement includes a central frame that is configured with means for releasably coupling the frame to a tractor and at least two forward crop engaging arms mounted on the frame. The forward crop engaging arms extend outward from a central axis to a first width such that the forward crop engaging arms have an outermost end. At least two rearward crop engaging arms are also mounted on the frame. The rearward crop engaging arms extend outward from a central axis to a second width in which the second width is greater than the first width with the rearward crop engaging arms each having an outermost end. The device also has a plurality of crop engaging members, with at least one crop engaging member being positioned on each of the forward and rearward crop engaging arms. The power transmission mechanism is configured to be operatively connected to the forward crop engaging arms and the rearward engaging arms and is configured to be releasably coupled to a power take off apparatus on the associated tractor.

DESCRIPTION OF THE DRAWING

In order to more fully understand the present invention, the following drawing is presented in which like reference numbers are use throughout the various drawing figures and in which.

DETAILED DESCRIPTION

Disclosed herein is a farm implement that is configured to be releasably coupled to a tractor that has at least on rearwardly oriented power take off device. Also disclosed herein is an assembly that comprises a suitably configured tractor and the farm implement disclosed herein.

Figure 1:
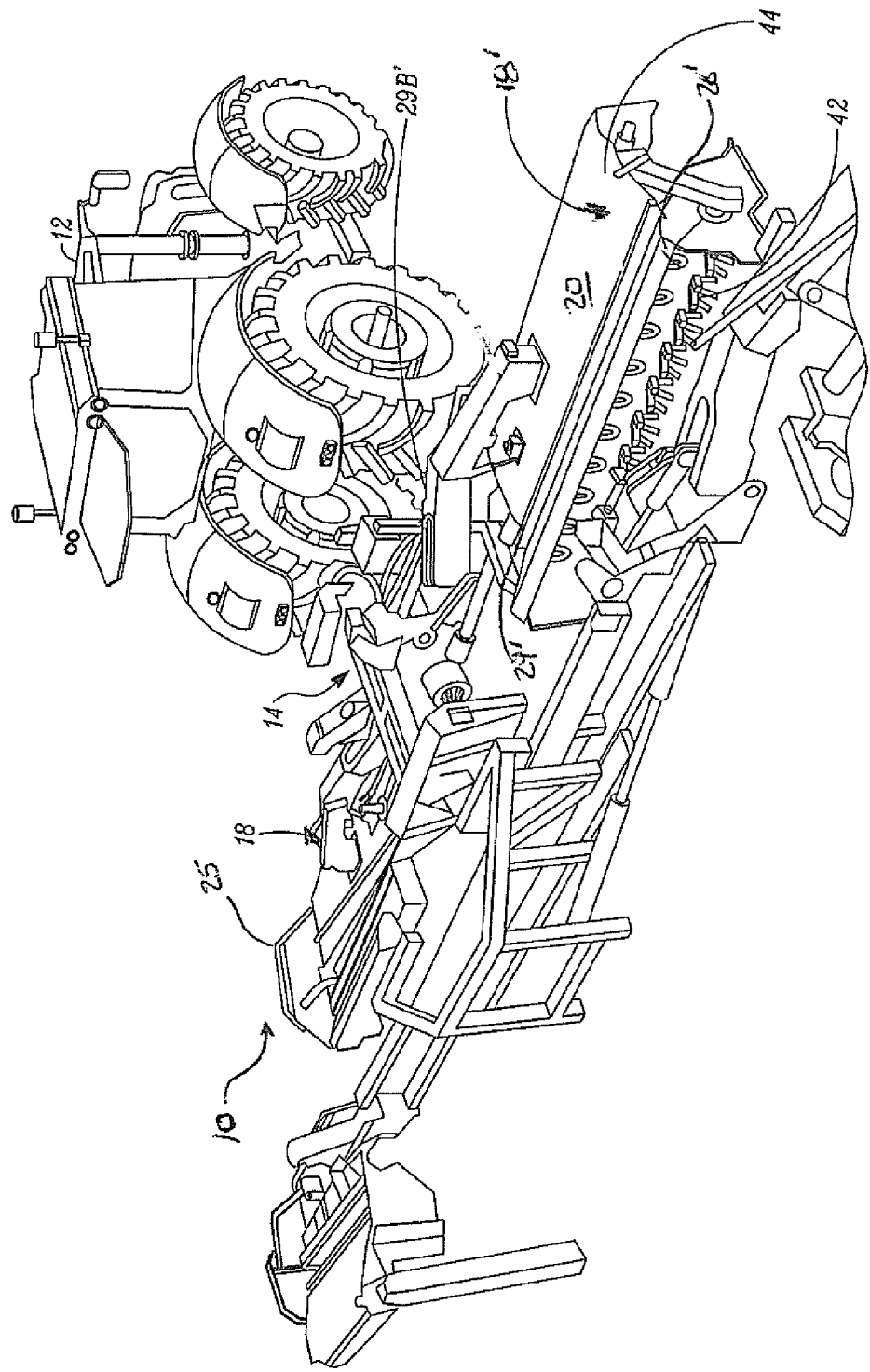
FIG. 1 is a perspective view of an embodiment of a farm implement device as disclosed herein in the deployed or use position as attached to a tractor.
Figure 2:
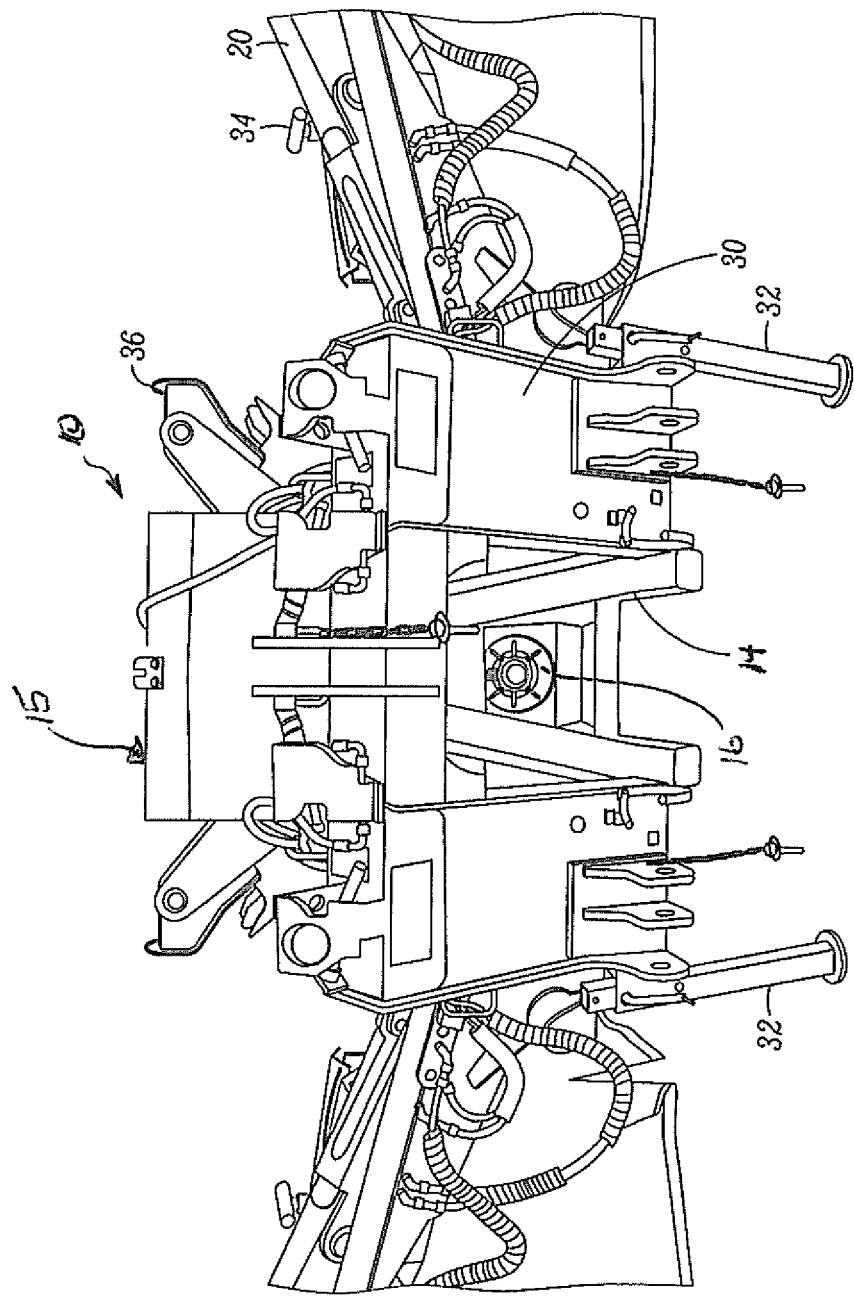
FIG. 2 is a detail view of an embodiment of a central housing of the farm implement device of FIG. 1.
Figure 3:
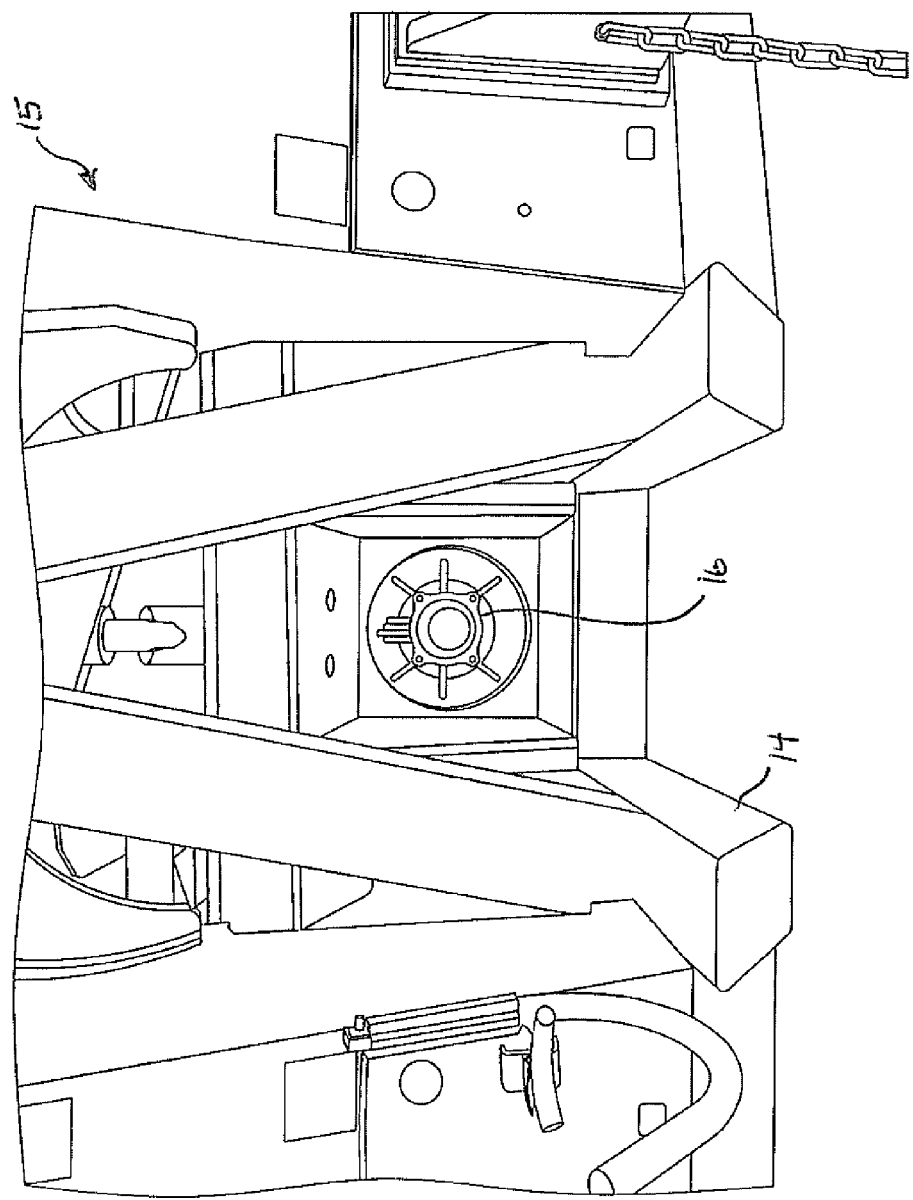
FIG. 3 is a detail view of an embodiment of the socket defined in the central housing of FIG. 2.

As depicted in FIG. 1, there is a farm implement device 10 in combination with a tractor 12. The farm implement device 10 as disclosed herein includes a central frame 14 that is configured with means for releasably coupling the central frame 14 of the farm implement device 10 to the associated tractor 12 such that the device 10 operatively contacts the power take-off of the associated tractor 12 to transfer power to the device 10. The coupling means as depicted in FIGS. 2 and 3. The coupling means includes a coupling member 15 having a socket 16 configured to receive the power take-off of the associated tractor 12.

The farm implement device 10 also includes at least two forward crop engaging arms 18, 18' that project outward from the central frame 14. The forward crop engaging arms 18, 18' can project outward from the frame at any suitable angle relative to the central frame 14. In the embodiment depicted in the various drawing figures, the forward crop engaging arms 18, 18' project laterally outward from the central frame 14 at a 90 degree angle to the central frame 14. The forward crop engaging arms 18, 18' can be connected to the central frame 14 by any suitable means. Where desired or required, the forward crop engaging arms 18, 18' are articulated relative to the central frame 14 such that the forward crop engaging arms 18, 18' can move from at least one lower crop engaging position and at least one upper position.

The forward crop engaging arms 18, 18' each include an extended elongated section 20 connected to the central frame 14 and extending outward therefrom. Each extended elongated section 20 has an elongated body member 22 having a first end 24 and an opposed second end 25 distal to the first end 24. Where desired or required, the extended elongated section 20 has a length that is equal to one half of the maximum width of the associated tractor 12. If desired, each elongated arm section 20 can have suitable means for adjusting the length of the associated elongated section 20 such that the adjusted length of the extended elongated section 20 is equal to one half of the maximum width of the associated tractor 12.

In the embodiment depicted in the various drawing figures, the forward crop engaging arms 18, 18' are each connected to suitable mowing members 26, 26' at the opposed second end 22 of the respective forward crop engaging arm 18 or 18'. Mowing members 26, 26' can be suitably configured to perform mowing operations. Mowing members 26, 26' can be commercially available units, if desired or required. The individual units can be powered by a suitable external power source, if desired or required. Alternately, the individual units can be configured to receive external control commands. While mowing members 26, 26' are described herein, it is contemplated that various other implements may be connected to forward crop engaging arms 18, 18'. As can be seen in FIG. 1, the respective forward crop engaging arm 18, 18' also each include an upper support member 29B connected to housing 44. In the embodiment depicted, the upper support member 29B is connected to the central frame 14 and extends to an outer location to which the housing 44 of the respective mowing member 26, 26' is connected. In embodiments such as the FIG. 1, the mowing member 26 or 26' can be configured as an elongated element that generally extends along an elongated axis defined from the first end 24 to the second end 25.

It is contemplated that the extended elongated section 20 of each forward crop engaging arm 18, 18' can be configured to convey external power to the associated mowing members 26, 26'. Similarly, each extended elongated section 20 can be configured to convey control commands to the respective mowing member 26, 26'. Non-limiting examples of such commands include start, stop commands as well as speed control commands. The extended elongated section 20, 20' can also communicate with certain gauges, outputs and monitors to assess the performance of the associated mowing member 26, 26'. In the embodiment depicted in the drawing figures, the forward crop engaging arms 18, 18' are connected to a central housing 30 that is part of the coupling means 15. The central housing 30 can be configured to engage the associated tractor 12 and can overly the socket 16 configured to engage the tractor's power take-off unit. The central housing 30 can also include suitable gauges, power hoses and the like necessary for the operation of the associated mowing members 26, 26'. The socket 16 is configured to transfer power from the power takeoff present on the associated tractor 12 to the associate mowing units 26, 26'.

The central housing 30 is mounted on the central frame 14 in any suitable manner. The central frame 14 can have any suitable configuration. In the embodiment depicted, the central frame 14 of the farm implement device 10 is an enforced elongated member that projects rearward from the back of the tractor 12 when the device 10 is in the use position. In the embodiment depicted, the central frame 14 is a suitably configured truss member. The central frame 14 can also be equipped with one or more landing gears attached at suitable locations. In the embodiment depicted in the device 10 includes a front landing gear 32 that is contiguously connected to the central housing 30.

In certain embodiments, it is contemplated that the forward crop engaging arms 18, 18' can articulate relative to the central frame 14. The forward crop engaging arms 18, 18' can be pivotally mounted relative to the central housing 30 or directly to the central frame 14 such that the respective forward crop engaging arms 18, 18' can move from a lower use position to an upper transit position (not shown). Suitable pivotal movement means can include various actuators and the like. As illustrated in FIG. 2, the farm implement device 10 can also include suitable hooks 34 and fastening members 36 to hold the arms 18, 18' in the upright or transit position. The forward crop engaging arms 18, 18' can also include means for moving the arms 18, 18' between the respective positions. It is also contemplated that the forward crop engaging arm members 18, 18' can be configured and balanced to permit a user to manually move the arms 18, 18' if desired or required. The forward crop engaging arms 18. 18' and associated frame 14 can also include suitable means to modulate and attenuate any bumps or bouncing to assure that the mowing members 26, 26' are stable during mowing operations. These can include, but are not limited to, shock absorbers, stabilizers and the like.

Figure 4:
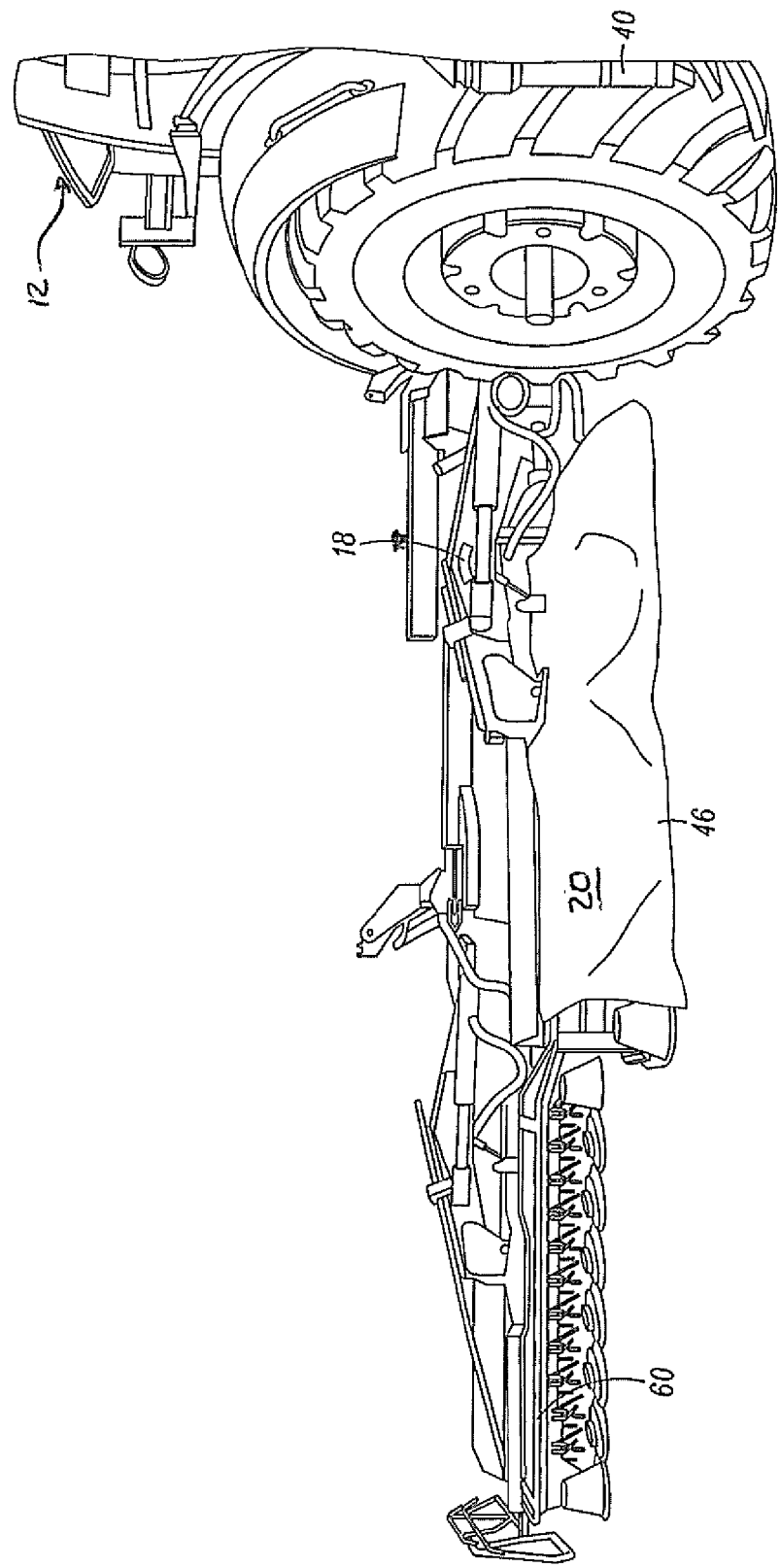
FIG. 4 is a side view of the farm implement device of FIG. 1.
Figure 5:
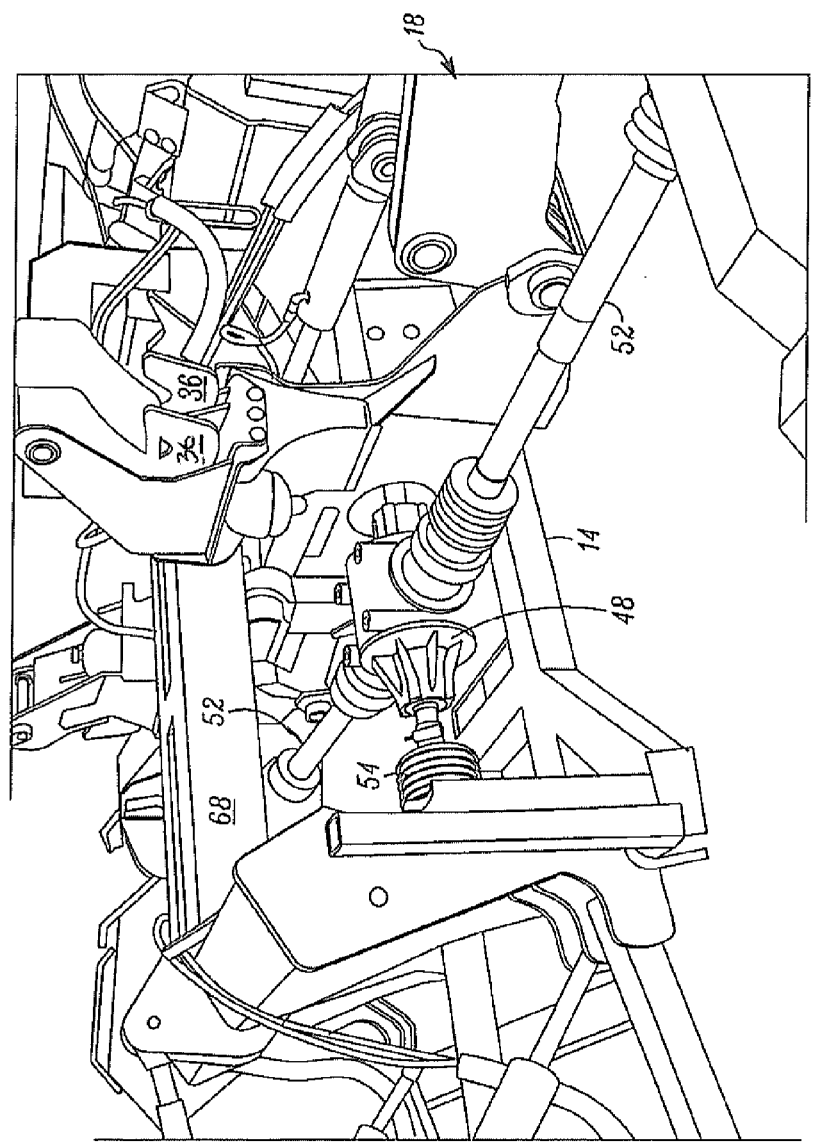
FIG. 5 is a detail view of an embodiment of the forward power transfer junction of the device of FIG. 1.

As seen in FIG. 4, in the extended or use position, the forward crop engaging arms 18, 18' position the associated mowing member 26 at a location rearward and outside of the associated rear wheel 40 of tractor 12 providing the mower member 26 with a clear path for mowing operations. The mowing member 26 can have any suitable configuration. Typically the mowing member 26 will have a cutting member such as rotating cutting member 42 positioned in a suitable housing 44. In the embodiment depicted, the second end 25 of elongated section 20 is connected to the housing 44 by suitable means and at a suitable position thereon. The mowing member 26 can also include a suitable flap or cover 46 that overlies the housing 44 and prevents mud or debris brought up from the tires 40 of tractor 12 from entering the cutting zone inside the housing 44.

The farm implement device 10 as disclosed herein includes a suitable power transmission mechanism 48 that includes at least one central junction 50 and at least one side drive shaft 52, 52' that is associated with each of the forward crop engaging arms 18, 18'. The power transmission mechanism 48 as disclosed herein also includes at least one intermediate drive shaft 54 that communicates with at least one additional device associated with the farm implemented device 10 and is operatively connected to the central junction 50. In the embodiment depicted in the drawing figures, the intermediate drive shaft is operatively connected to suitable rearward crop engaging arms 60, 60' which will be discussed in greater detail subsequently.

In the embodiment depicted, the central junction 50 can function as a differential gear box 48 having an outlet that communicates with socket 16 to operatively receive the power take off shaft from the associated tractor 12. The differential 48 can be mounted to the central frame 16 at a location rearward of central housing 30. The differential 48 can be configured to transfer rotational power from the power take off to the side drive shafts 52, 52' and the intermediate drive shaft 54.

Figure 6:
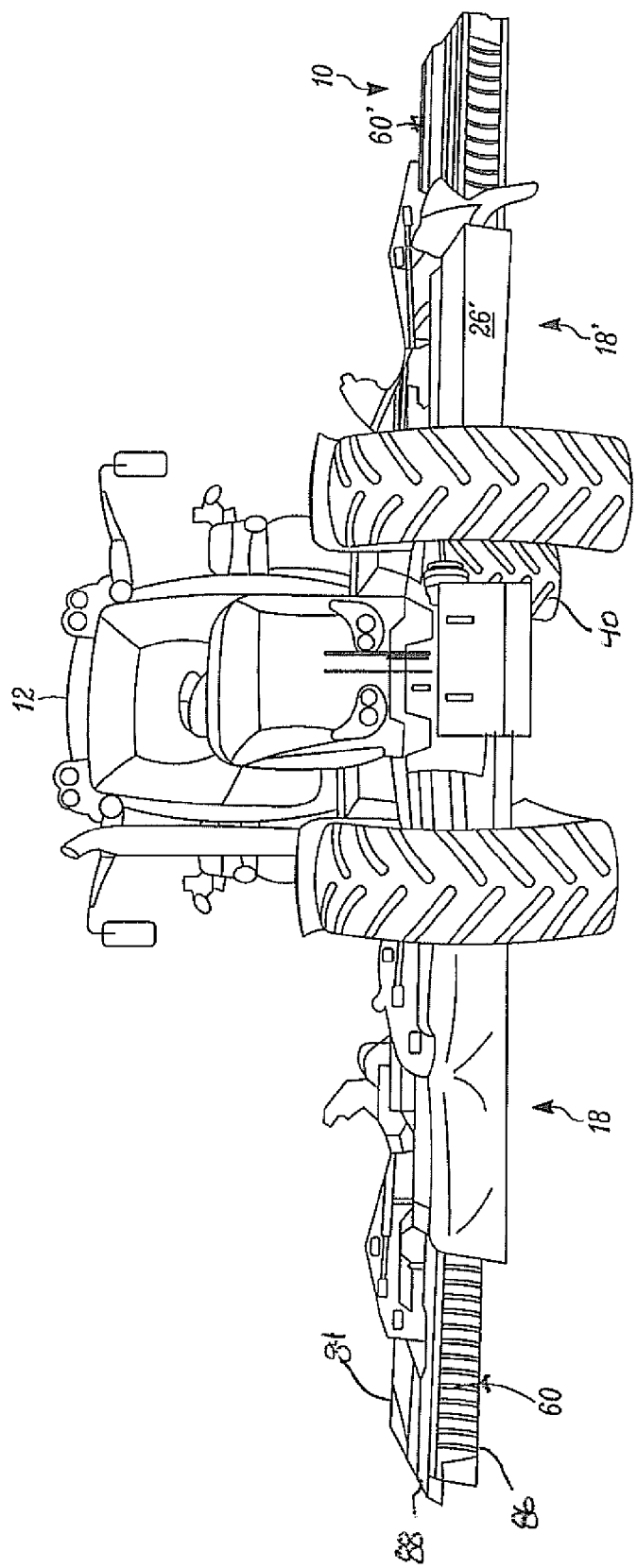
FIG. 6 is a front view of an assembly of a tractor and the device depicted in FIG. 1 in which the forward and rearward crop engaging arms are in extended position.
Figure 7:
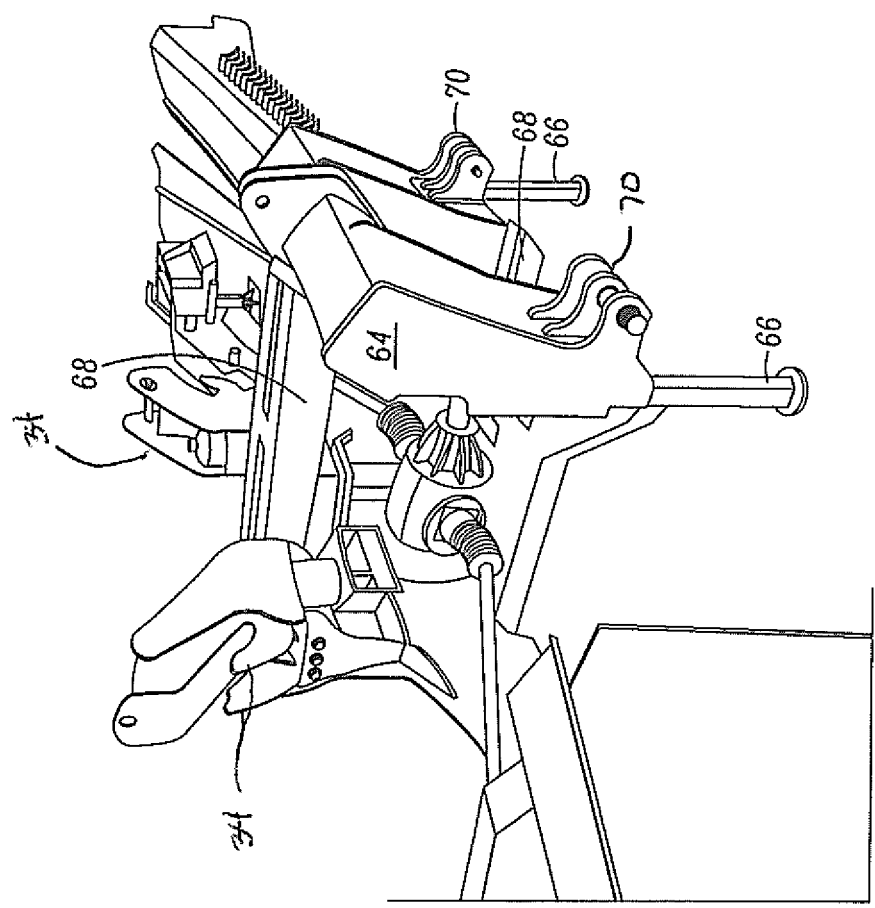
FIG. 7 is a rear perspective view of an embodiment of the central frame and associated apparatus of the farm implement device of FIG. 1.
Figure 8:
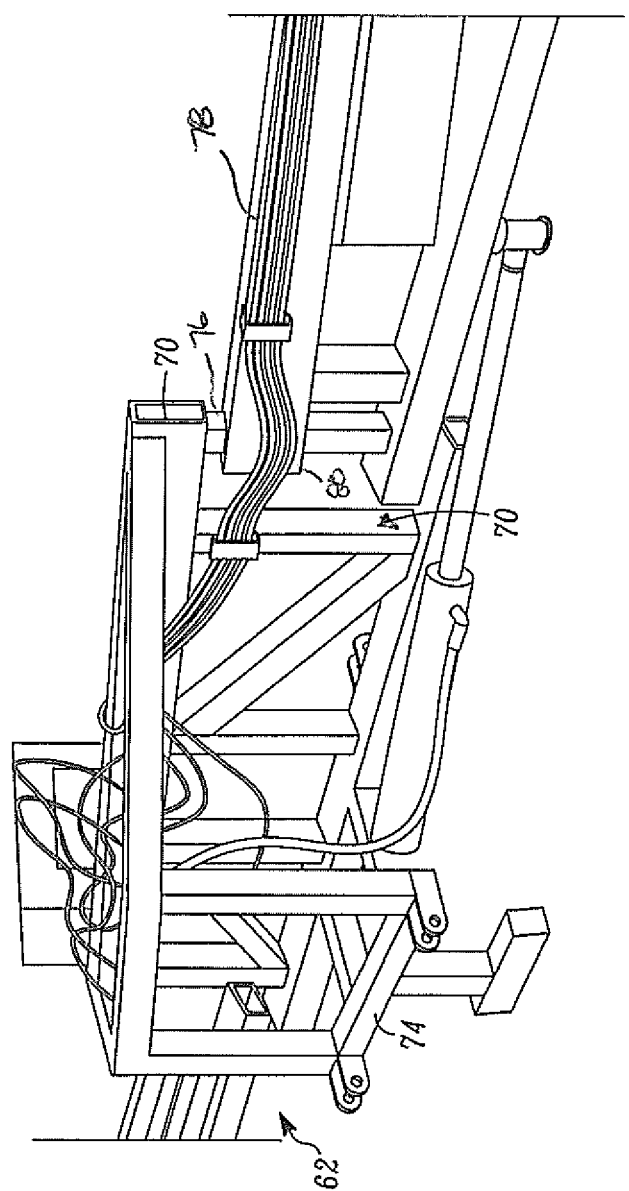
FIG. 8 is a perspective view of the central brace mechanism of an embodiment of the end frame of the device of FIG. 1 as viewed from the rear.
Figure 9:
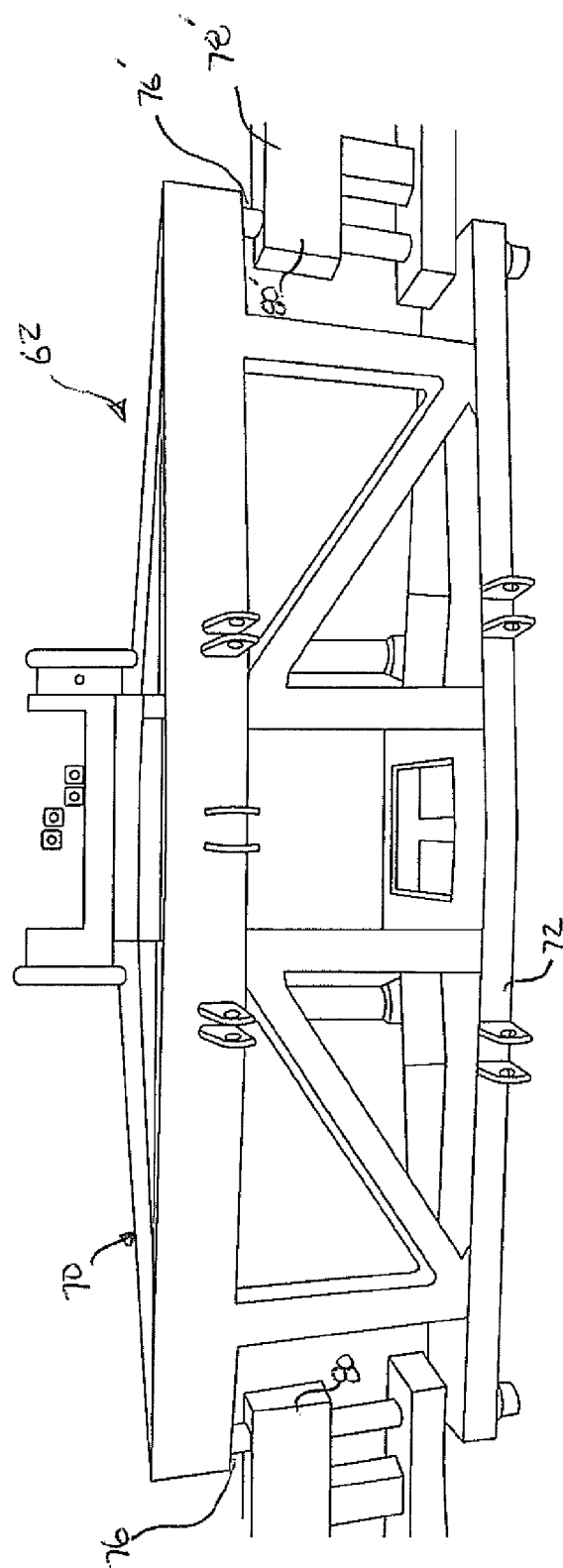
FIG. 9 is a front view of the central brace mechanism of FIG. 8.
Figure 10:
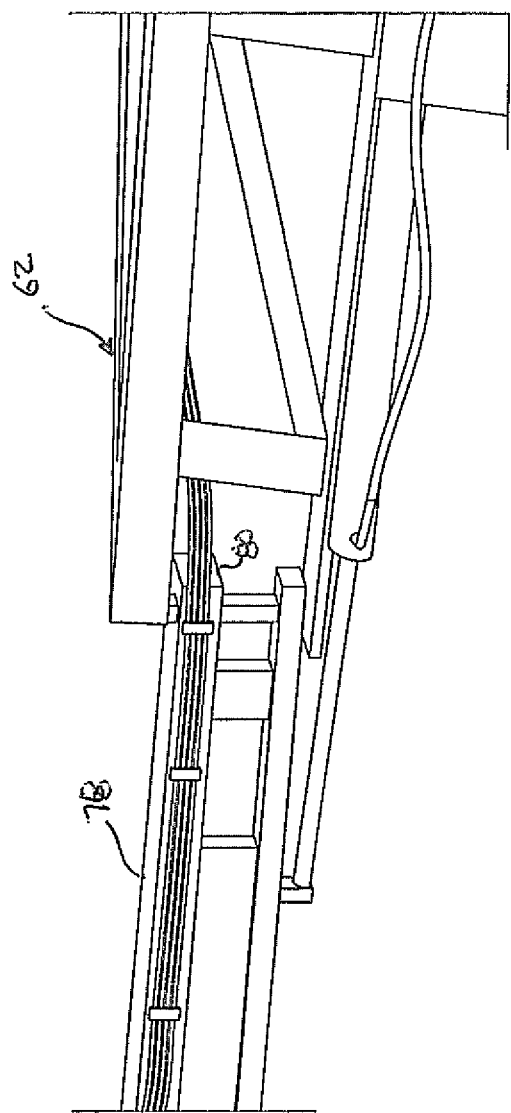
FIG. 10 is a detail of the mounting junction between the intermediate articulating element and mower element.
Figure 11:
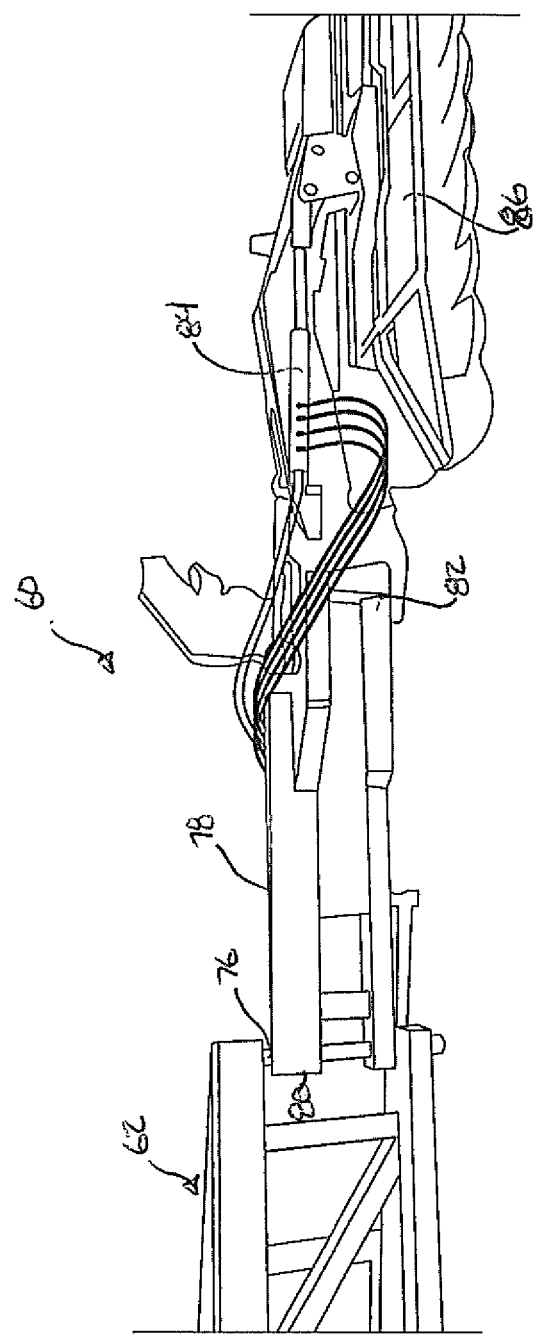
FIG. 11 is a detail view of an embodiment of a single rearward crop engaging member of FIG. 1.
Figure 12:
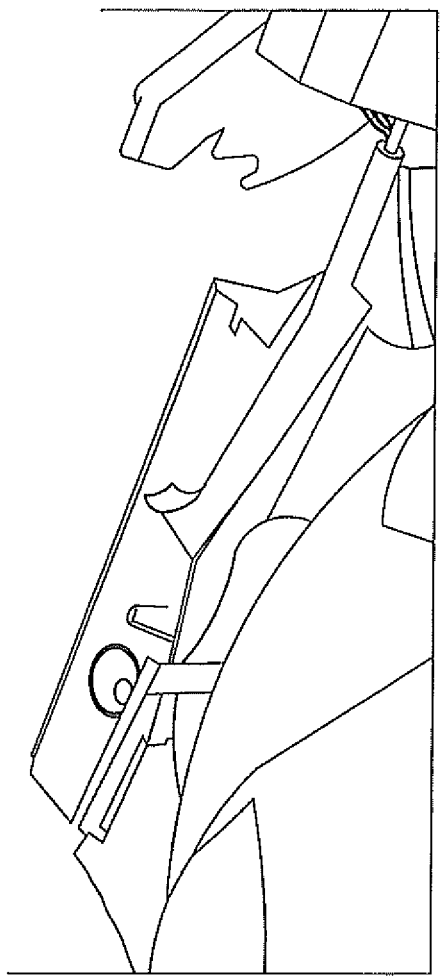
FIG. 12 is a is a detail view of an extension arm associated with one of the rear mowing units of FIG. 1.
Figure 13:
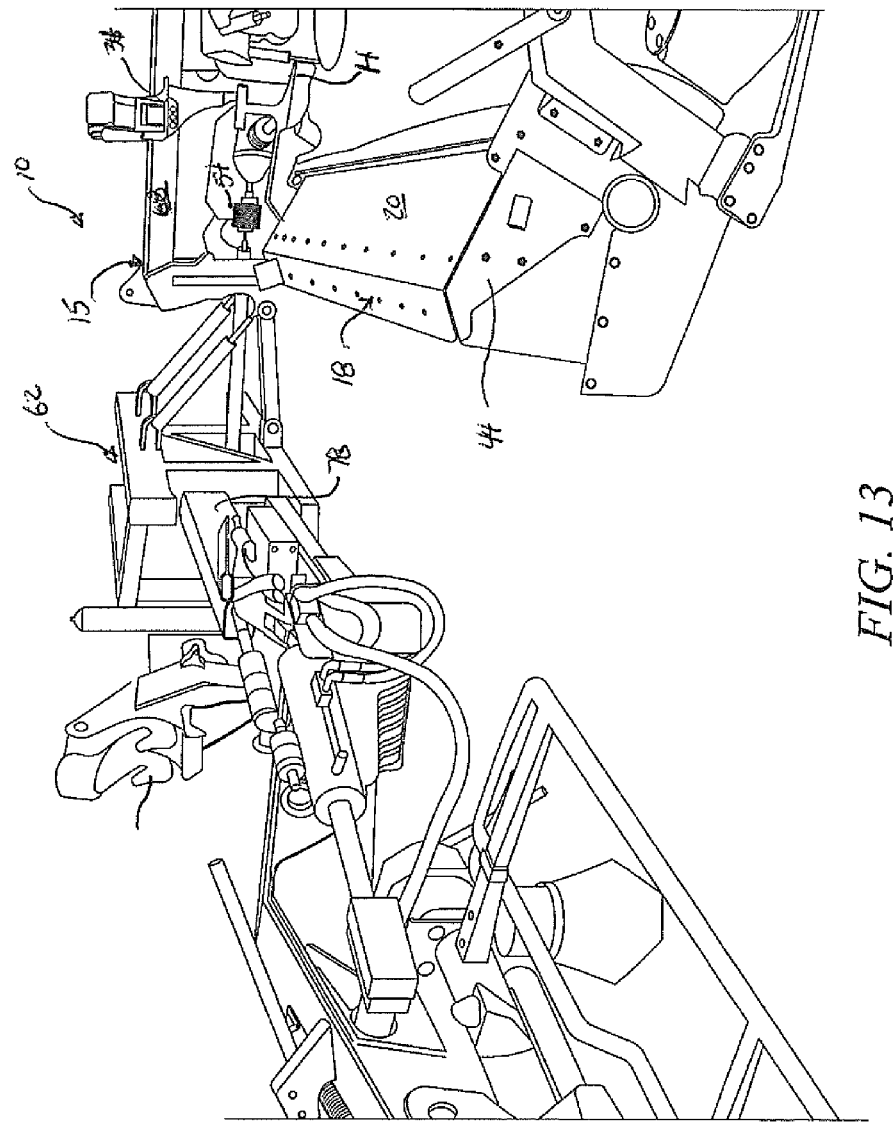
FIG. 13 is a side detail view of one of the rear mowing units showing the hydraulic lift actuator on rearward arm and the forward mowing units as disclosed herein.
Figure 14:
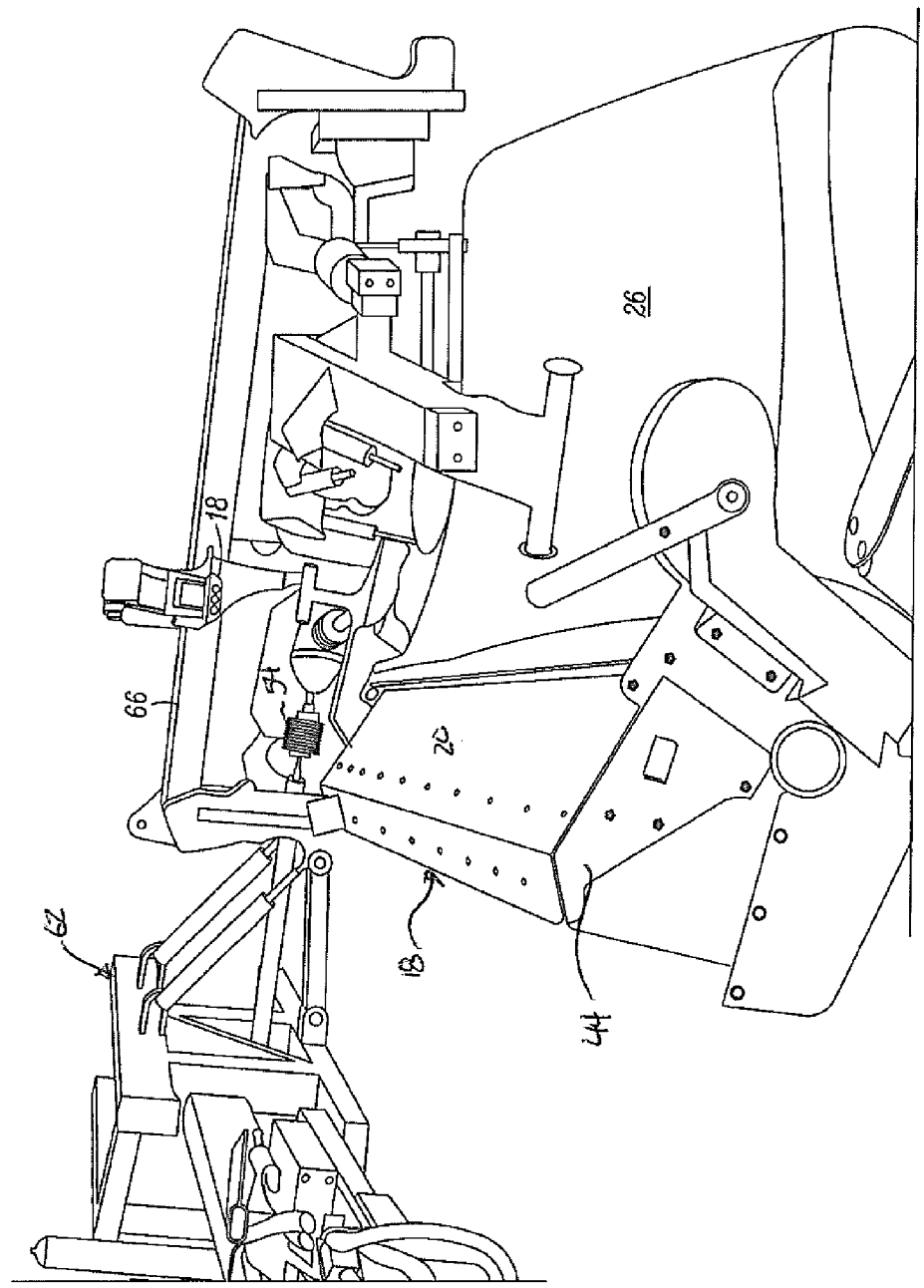
FIG. 14. is a detail view of a front mowing unit junction.
Figure 15:
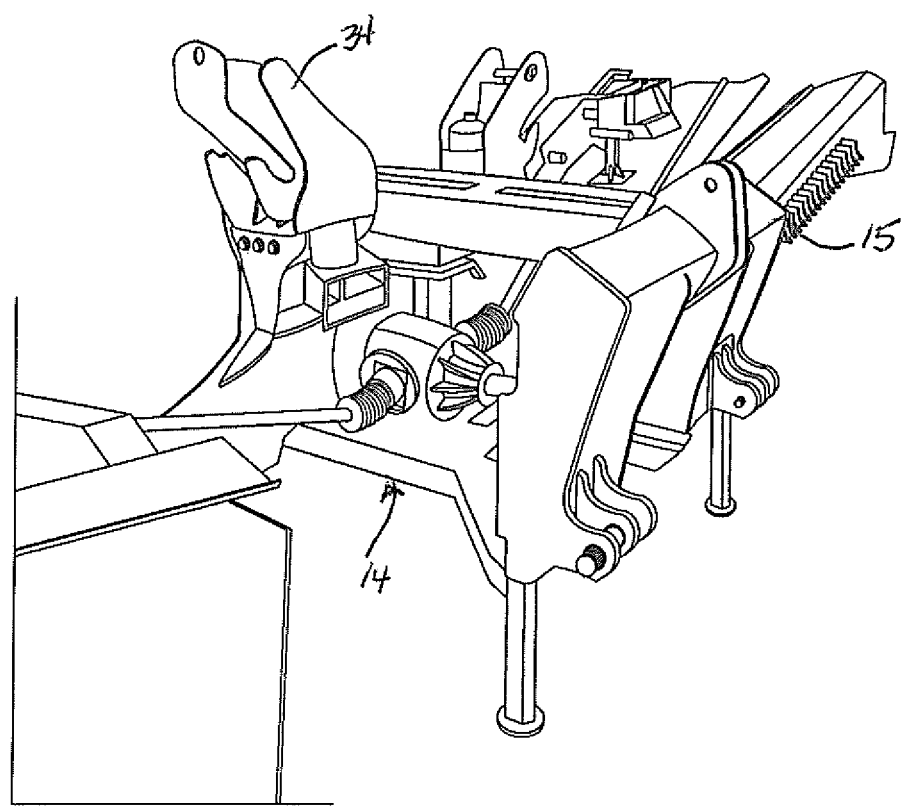
FIG. 15 is a detail perspective view of the mounting junction of FIG. 14 with landing gear extended.
Figure 16:
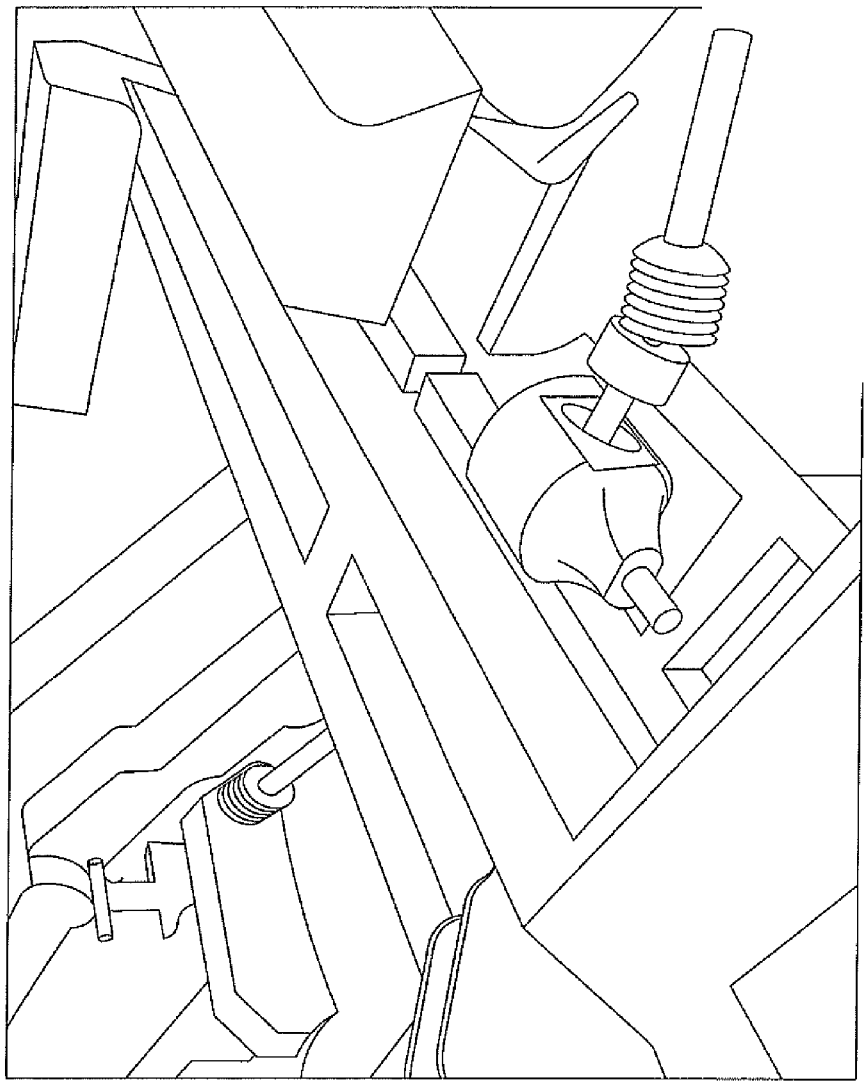
FIG. 16 is as detail of the power transfer junction with the rear transfer member removed and the front mowers in the partially retracted position.
Figure 17:
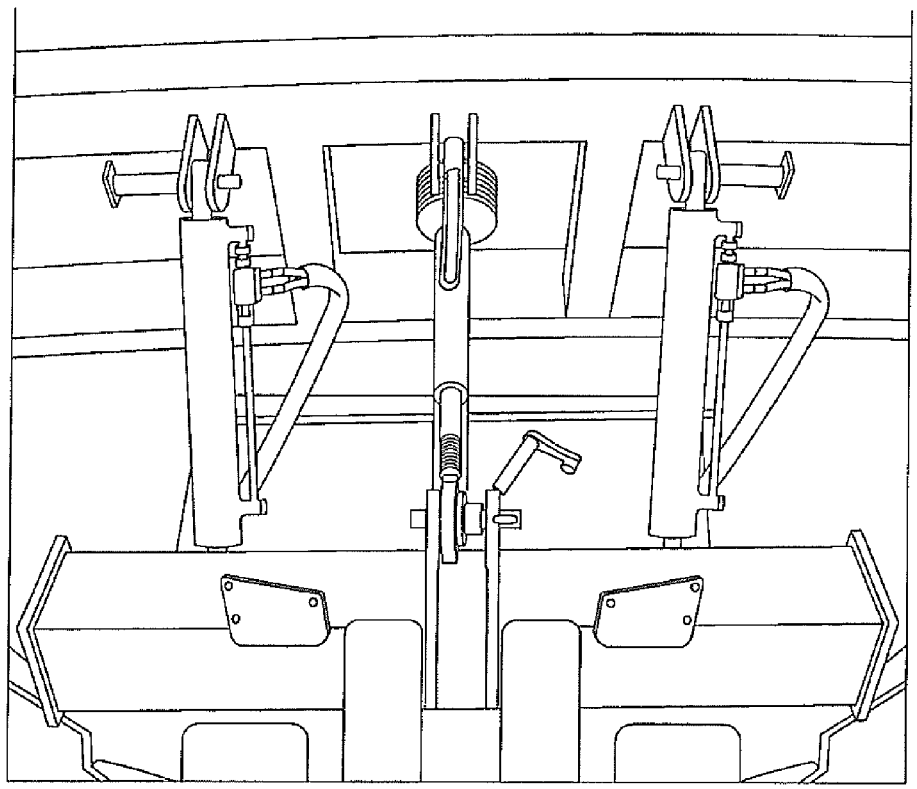
FIG. 17 is view of the power transfer mechanism of in conjunction with rear mower arm mounted mechanisms.
Figure 18:
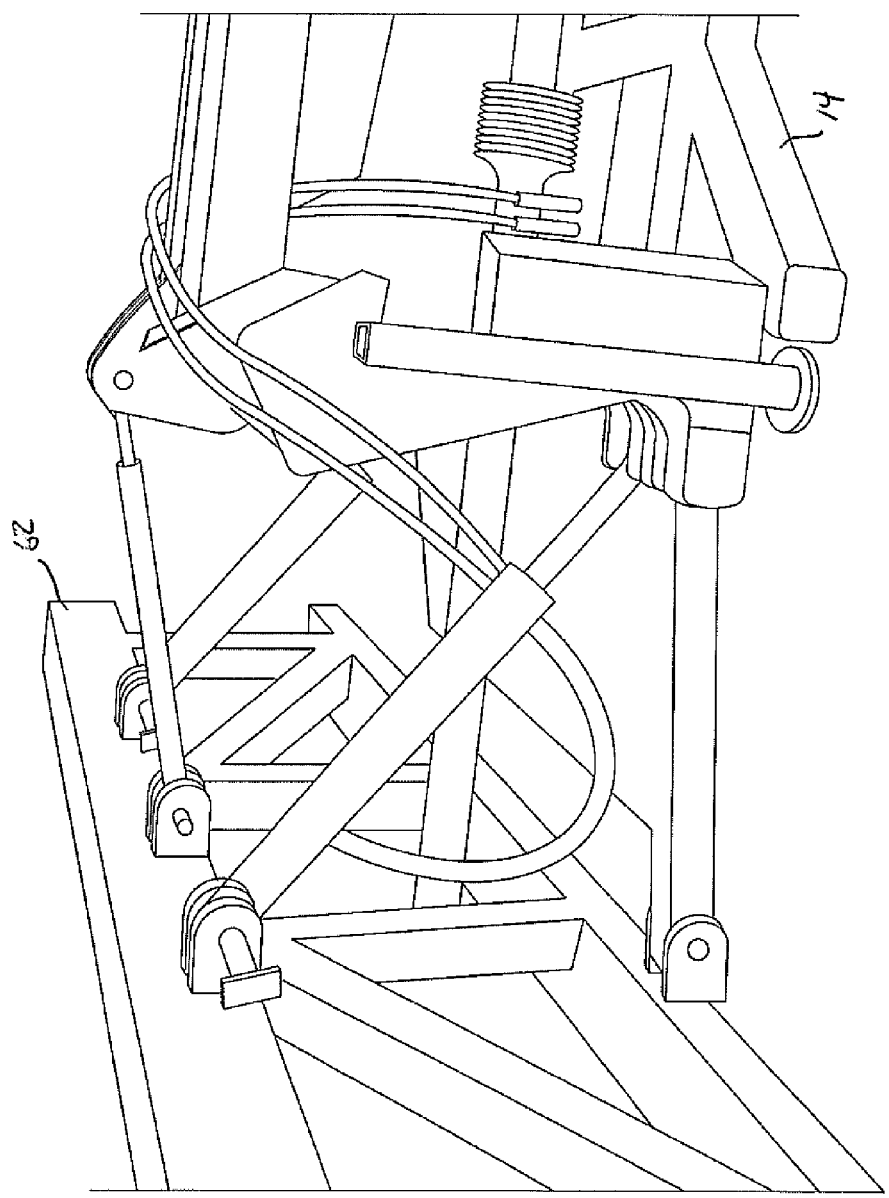
FIG. 18 is a detail view of the power transfer mechanism located between the power transfer junction and the rear mower members.

The farm implement disclosed herein also includes at least two rearward crop engaging arms 60, 60' that are connected to the central frame 30 by suitable means. The rearward crop engaging arms 60, 60' extend outward from a central axis to a second width that is outside or beyond the width of tractor 12. In the embodiment depicted, the second width is greater than the first width defined by the forward crop engaging arms 18, 18' as illustrated in FIG. 6.

The rearward crop engaging arms 60, 60' can be mounted to the central frame 30 in any suitable manner. In the embodiment depicted in the drawing figures, the rear region of the central frame 30 can be removably coupled to an end frame 62 by any suitable means. Where desired or required, the central frame 30 can be configured with a suitable connection member 64 that projects upward from the surface of central frame 30. The connection member 64 can be configured to releasably engage end frame 62. Thus the connection member 64 can include suitable hooks 70, clamps etc to keep the two elements in secure relationship with one another during operation and use. In the embodiment depicted, the connection member 64 can be configured with suitable retractable landing gear 66 and can be configured with an opening 68 configured to receive the intermediate drive shaft 54 (associated with rearward crop engaging arms 60, 60') such that one end of shaft 54 is in operative contact with the differential 48 and the opposed end be in suitable operative contact with the rearward crop engaging arms 60, 60'.

For purposes of stability and added functionality, the central frame 30 can also be configured with an upper brace 68 that extends from the upper portion of central housing 30 to the top portion of the connection member 64.

The rearward crop engaging arms 60,60' are mounted on the end frame 62 in suitable operative orientation. In the embodiment illustrated in the various drawing figures the end frame 62 is composed of a central member 70 that is connectable to the central frame 30. In the embodiment depicted, the central member 70 is a three dimensional frame member having an engaging section 72 and an opposed back section 74. The central member 70 of the end frame 62 as depicted in drawing figures is a frusto-pyramidal member in which the smaller back section 74 is oriented distal to the engaging section 72. The central member 70 has end bars 76, 76' extending from the top to the bottom of the central member 70.

An intermediate arm member 78 is pivotally mounted to each of the respective end bars 76. The intermediate arm members 78 each have a first end 80 pivotally mounted to the respective end bar 76 and a second end 82 opposed to the first end 80. A mowing member 84 is operatively attached to the second end 82 of the intermediate arm member 78. The pivotal motion of the associated intermediate arm member 78 can be controlled by a suitable device operatively connected to the central housing by any suitable device or mechanism. In the embodiment depicted in the drawing figures, the controlling device is an actuator 84 that is connected to the intermediate arm 78 and the central member 70.

The intermediate arm member(s) 78 will each have a total length that projects outward from the central member 70 to a spaced distance that is sufficient to position the mowing member 84 at a spaced lateral distance behind and outward from the tractor 12 such that the path of the mowing member 84 is parallel to the path of the mowing member 26. In various embodiments, the mowing members 26 and 84 are positioned such that the paths overlap slightly.

The rearward crop engaging arms 60, 60' can also include suitable wires, conduits and the like to deliver power to the respective mowing members 84. The mowing members 84 can each be configured with a cutting head 86 such as a rotating cutting head that is mounted in the suitable housing 88. In the embodiment depicted in the drawing figures, the intermediate arm members 78 are each composed of a lateral elongated member 88 that is pivotally mounted to the end bar 76. Each intermediate arm member 78 and elements associated with it can move between an extended use position (as shown) and a retracted position suitable for transit.

The intermediate arm member 78 can be configured to include a mounting mechanism 90 that is positioned proximate to the mowing member 80 and distal to the central member 70 of the end frame 62. The mounting mechanism 90 can be configured with suitable actuators, controls, stabilizers, etc as desired or required to position and operate the associated mowing member 84.

The power transmission mechanism as disclosed herein is operatively connected to the rearward crop engaging arms 60, 60'. In the embodiment depicted, a suitable power converter is mounted on the end frame 62 that can transfer power from the intermediate drive shaft 54 to the rearward crop engaging arms 60, 60'. The transferred power can be used for various operations including but not limited to powering the rotating cutting head 86, triggering and powering actuators 90 that control pivotal movement of the crop engaging arms 60, 60' as well as controlling the monitoring the various operations as they occur. In the embodiment depicted, the power converter converts power transferred from the tractor power take off through the intermediate drive shaft into electrical current. Other transfer mechanisms that interact with the intermediate drive shaft 54 are also considered within the purview of this disclosure.

The crop engaging members are mowing devices having a defined width, the crop engaging members positioned in staggered relationship relative to the central frame. Where desired or required, the tractor 12 can be configured with at least one front-mounted crop engaging member (not shown). Where employed, it is contemplated that the front-mounted crop engaging member can have a width that equals or exceeds the greatest width of the associated tractor 12. In various applications, it is contemplated that the front-mounted crop engaging member will have a width that spans the distance between the inwardly oriented crop engaging heads that are associated with the farm implement device 10. In the embodiment depicted in the forward crop engaging arms have mower members inward of the rearward mower members. It is contemplated that the other orientations of frontward and rearward crop engaging arms are possible.

The invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A farm implement configured to be releasably coupled to a tractor, the tractor having at least one rearwardly oriented power take off device, the farm implement comprising:
    a central frame, the central frame having a forward region and an opposed rearward region and means for releasably coupling the central frame to a tractor, wherein the releasable coupling means is located proximate to the forward region of the central frame, the releasable coupling means including a coupling member, the coupling member having a socket configured to receive the power take-off device of the tractor, the central frame having a length measured from the forward region to the rearward region and a width, wherein the central region length is greater than the central region width;
    at least two first crop engaging arms pivotally mounted on the central frame at a location proximate to the forward region of the central frame, the first crop engaging arms extending outward from a central axis to a first width wherein the first crop engaging arms have an outermost end;
    an end frame releasably connected to the opposed rearward region of the central frame, the end frame having a forward region and a rearward region and two side members, wherein the end frame has a length measured from the end frame forward region to the end frame rearward region and a width, wherein the end frame width is greater than the end frame length;
    at least two second crop engaging arms operatively connected to the end frame independent of the at least two first crop engaging arms, the at least two second crop engaging arms operatively connected to the side members of the end frame rearward of the at least two first crop engaging arms at a location proximate to the rearward region of the central frame, the second crop engaging arms extending outward from the central axis to a second width wherein the second width is greater than the first width, wherein the second crop engaging arms have an outermost end;
    a plurality of crop engaging members, wherein at least one crop engaging member is positioned on each of said first and second crop engaging arms; and
    at least one power transmission mechanism operatively connected to said first and second crop engaging arms, the power transmission mechanism configured to be releasably coupled to the rearwardly oriented power take off apparatus on the associated tractor.

2. The farm implement apparatus of claim 1 wherein the crop engaging members are mowing devices, each mowing device having a defined width, the crop engaging members positioned in staggered relationship relative to the central frame.

3. The farm implement of claim 1 wherein the first crop engaging arms are oriented proximate to the tractor when the device is in the use position.

4. The farm implement apparatus of claim 2 wherein the power transmission mechanism comprises at least one central junction, at least one side drive shaft associated with each of the first crop engaging arms and an intermediate drive shaft operatively connected to the central junction, wherein the intermediate drive shaft extends into the end frame at a location central thereto, the intermediate drive shaft, operatively connected to the second crop engaging arms.

5. The farm implement apparatus of claim 1 further comprising at least one control mechanism, the control mechanism configured to operate the respective crop engaging arms.

6. The farm implement apparatus of claim 1 further comprising at least one mechanism configured to move an associated crop engaging arm from the first use position to at least one second position, wherein the device further comprises at least one central junction, at least one side drive shaft associated with each of the first crop engaging arms and at least one intermediate drive shaft operatively connected to the central junction, the intermediate drive shaft, operatively connected to the rearward crop engaging arms.

7. The farm implement apparatus of claim 4 wherein the power junction is a differential.

8. The farm implement apparatus of claim 1 further comprising an end frame connected to the central frame wherein the second crop engaging arms are mounted to the end frame and wherein the power transmission mechanism comprises at least one differential mounted on the central frame at least one drive shaft coupled to the drive shaft associated with each of the first crop engaging arms, at least one intermediate drive shaft operatively connected to the differential and communicating with the second crop engaging arms.

9. The farm implement apparatus of claim 8 wherein the end frame includes at least one releasable connection device oriented between the end frame and a location on the central frame distal to the means for releasable coupling to the tractor.

10. A farm implement assembly comprising:
    a tractor, the tractor having a front and a width, and at least one rearwardly oriented power take off device; and
    a farm implement that is composed of
        a central frame, the central frame having a forward region and an opposed rearward region and means located proximate to the forward region for releasably coupling the central frame to the tractor, the releasable coupling means including a coupling member, the coupling member having a socket configured to receive the power take-off device of the tractor, the central frame having a length measured from the forward region to the rearward region and a width, wherein the central region length is greater than the central region width;
        at least two first crop engaging arms pivotally mounted on the central frame at a location proximate to the forward region of the central frame, the first crop engaging arms extending outward from a central axis to a first width wherein the first crop engaging arms have an outermost end;
        an end frame connected to the opposed rearward region of the central frame, the end frame having a forward region and a rearward region and two side members, wherein the end frame has a length measured from the end frame forward region to the end frame rearward region and a width, wherein the end frame width is greater than the end frame length;
        at least two second crop engaging arms operatively connected directly to the central frame independent of the at least two first crop engaging arms, the at least two second crop engaging arms operatively connected rearward of the at least two first crop engaging arms at a location proximate to the rearward region of the central frame, the at least two second crop engaging arms extending pivotally from a first retracted position to a position extended outward from the central axis to a second width wherein the second width is greater than the first width, wherein the second crop engaging arms have an outermost end;

a plurality of crop engaging members, wherein at least one crop engaging member is positioned on each of said first and second crop engaging arms; and at least one power transmission mechanism operatively connected to said first and second crop engaging arms, the power transmission mechanism configured to be releasably coupled to the rearwardly oriented power take off apparatus on the associated tractor.

11. The farm implement assembly of claim 10 wherein the crop engaging members are mowing devices, each mowing device having a defined width, the crop engaging members positioned in staggered relationship relative to the central frame.

12. The farm implement assembly of claim 10 wherein the first crop engaging arms are oriented proximate to the tractor when the device is in the use position.

13. The farm implement assembly of claim 12 wherein the power transmission mechanism comprises at least one central junction, at least one side drive shaft associated with each of the first crop engaging arms and at least one intermediate drive shaft operatively connected to the central junction, the intermediate drive shaft, operatively connected to the second crop engaging arms.

14. The farm implement assembly of claim 13 wherein the power transmission device includes a differential mounted on the central frame.

15. The farm implement assembly of claim 10 further comprising at least one control mechanism, the control mechanism configured to operate the respective crop engaging arms.

16. The farm implement assembly of claim 10 further comprising at least one mechanism configured to move an associated crop engaging arm from the first use position to a at least one second position, wherein the device further comprises at least one central junction, at least one side drive shaft associated with each of the first crop engaging arms and at least one intermediate drive shaft operatively connected to the central junction, the intermediate drive shaft, operatively connected to the second crop engaging arms.

17. The farm implement assembly of claim 10 further comprising at least one forward crop engaging member the crop engaging member operatively connected to the front to the tractor, the forward crop engaging member having a functional width, wherein the functional width of the forward crop engaging member corresponds to the width of the tractor and wherein the one of the first crop engaging arms or the second crop engaging arms are positioned at a location corresponding to a boundary defined by the functional width, and wherein remaining crop engaging arms are positioned exterior to a corresponding functional width of the first or second corresponding crop engaging arms.

* * * * *

UNITED STATES PATENT AND TRADEMARK OFFICE
CERTIFICATE OF CORRECTION

| | | |
|---|---|---|
| PATENT NO. | : 8,769,916 B2 | Page 1 of 1 |
| APPLICATION NO. | : 13/467714 | |
| DATED | : July 8, 2014 | |
| INVENTOR(S) | : Leon Van Loon | |

It is certified that error appears in the above-identified patent and that said Letters Patent is hereby corrected as shown below:

In the Title, item (54):

"RELESABLY" should be -- RELEASABLY --;

In the Assignee, item (73):

The state of the Assignee, "MO", should be -- MI --.

Signed and Sealed this
Seventh Day of June, 2016

Michelle K. Lee
*Director of the United States Patent and Trademark Office*